June 23, 1964

H. R. KOLK ETAL 3,138,191

METAL ROLLING MACHINE

Filed March 6, 1961

INVENTOR.
Henry R. Kolk
Carl F. Wahl
BY Popp and Sommer
ATTORNEYS.

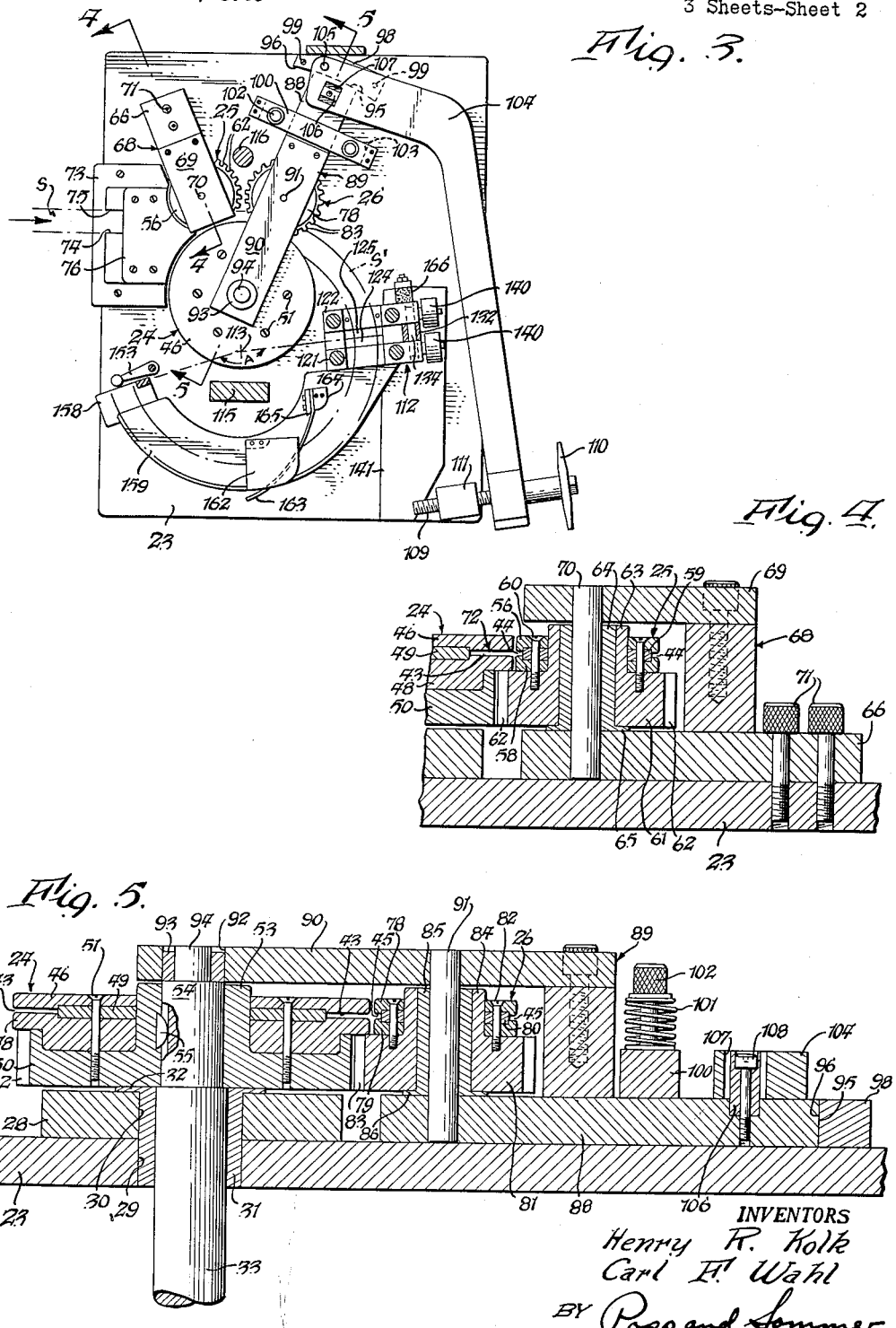

June 23, 1964  H. R. KOLK ETAL  3,138,191
METAL ROLLING MACHINE

Filed March 6, 1961  3 Sheets-Sheet 3

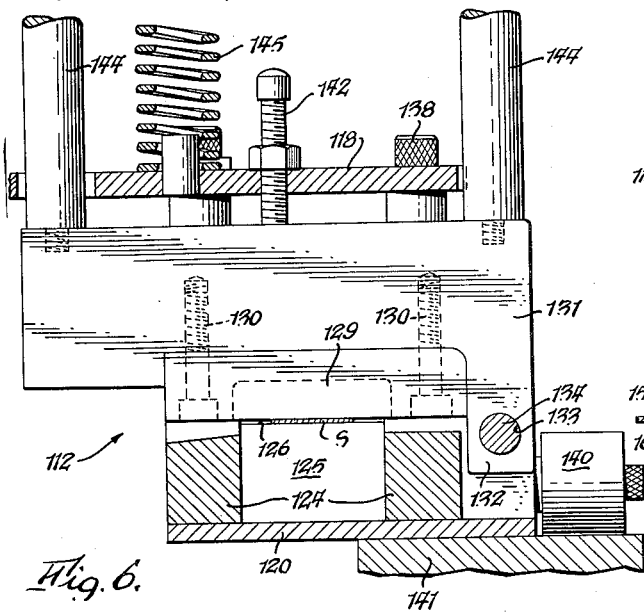

Fig. 6.

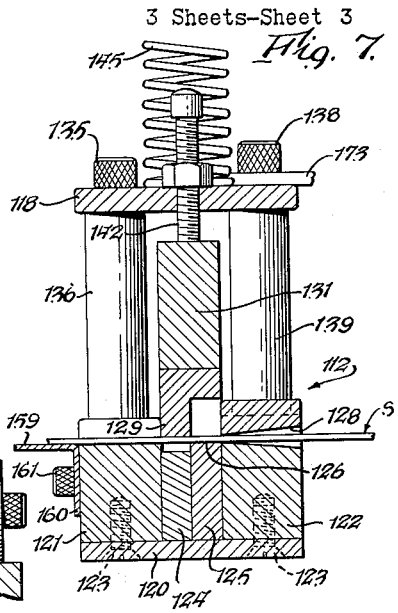

Fig. 7.

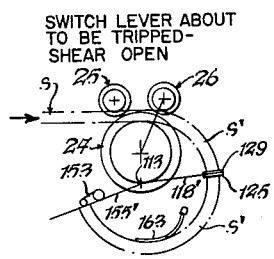

Fig. 8. SWITCH LEVER ABOUT TO BE TRIPPED— SHEAR OPEN

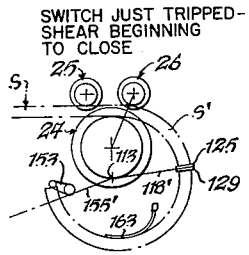

Fig. 9. SWITCH JUST TRIPPED— SHEAR BEGINNING TO CLOSE

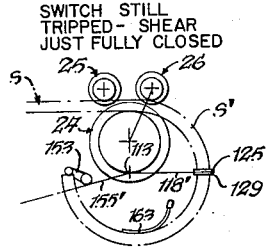

Fig. 10. SWITCH STILL TRIPPED— SHEAR JUST FULLY CLOSED

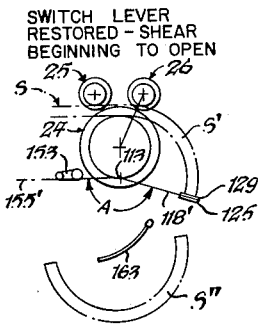

Fig. 11. SWITCH LEVER RESTORED — SHEAR BEGINNING TO OPEN

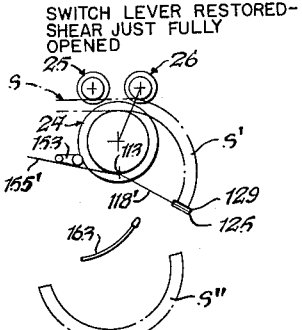

Fig. 12. SWITCH LEVER RESTORED— SHEAR JUST FULLY OPENED

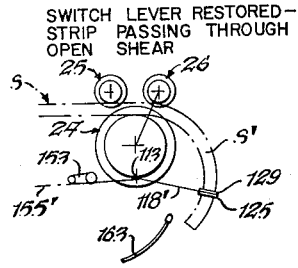

Fig. 13. SWITCH LEVER RESTORED— STRIP PASSING THROUGH OPEN SHEAR

INVENTORS.
Henry R. Kolk
Carl F. Wahl
BY Popp and Sommer
ATTORNEYS.

ated June 23, 1964

United States Patent Office 3,138,191
Patented June 23, 1964

3,138,191
METAL ROLLING MACHINE
Henry R. Kolk, Buffalo, and Carl F. Wahl, East Aurora, N.Y., assignors to Kolk Mfg. Co., Inc., Buffalo, N.Y., a corporation of New York
Filed Mar. 6, 1961, Ser. No. 93,635
7 Claims. (Cl. 153—2)

This invention relates to metal rolling machines, and more particularly to improvements in a machine for edge rolling a metal strip into curved shape.

One of the important objects of the present invention is to provide a machine for producing metal segments without waste of material.

Another important object is to provide such a machine which produces such segments rapidly.

These principal objects are achieved by providing a machine which edge rolls a continuously moving metal strip into curved shape and successively cuts off segments of predetermined length from the curved portion so formed.

Another object of the invention is to provide such a machine in which means are provided to adjust the radius of curvature of the segments formed as well as to adjust their effective length.

Other objects are to provide such a machine which is relatively simple in construction considering the function which it performs, sturdy and not likely to get out of order or require repair.

Still further objects and advantages will be apparent from the following detailed description of a preferred embodiment of the present invention which is illustrated in the accompanying drawings wherein:

FIG. 3 is a horizontal and sectional view thereof, taken on line 3—3 of FIG. 2;

FIG. 4 is an enlarged fragmentary vertical sectional view thereof, taken on line 4—4 of FIG. 3;

FIG. 5 is an enlarged fragmentary vertical sectional view thereof, taken on line 5—5 of FIG. 3;

FIG. 6 is an enlarged fragmentary vertical sectional view thereof, taken on line 6—6 of FIG. 1;

FIG. 7 is an enlarged fragmentary vertical sectional view thereof, taken on line 7—7 of FIG. 2;

FIGS. 8 through 13 are diagrammatic representations of certain components of the inventive machine and illustrating sequentially the operation thereof to form a segmental article from a metal strip.

Figure 1:
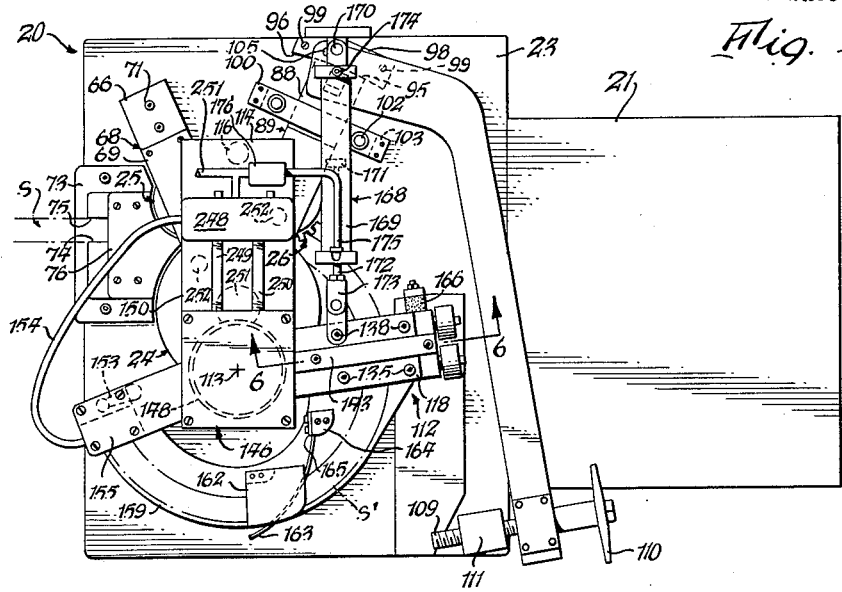
FIG. 1 is a top plan view of a metal rolling machine constructed in accordance with the principles of the present invention.

Referring to the preferred embodiment of the present invention illustrated in the drawings, the numeral 20 represents generally the frame of the machine which is shown as including a horizontal table 21 having legs 22. Arranged on top of the table 21 and suitably secured thereto is a relatively heavy plate or machine base 23. Three rollers represented generally at 24, 25 and 26, respectively, are arranged above the machine base plate 23 with their axes extending vertically.

Figure 2:
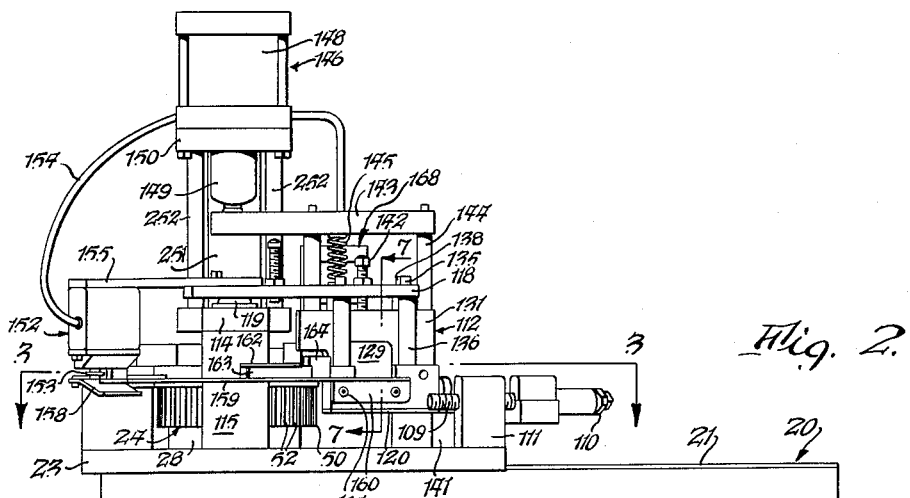
FIG. 2 is a side elevational view thereof.
Figure 2:
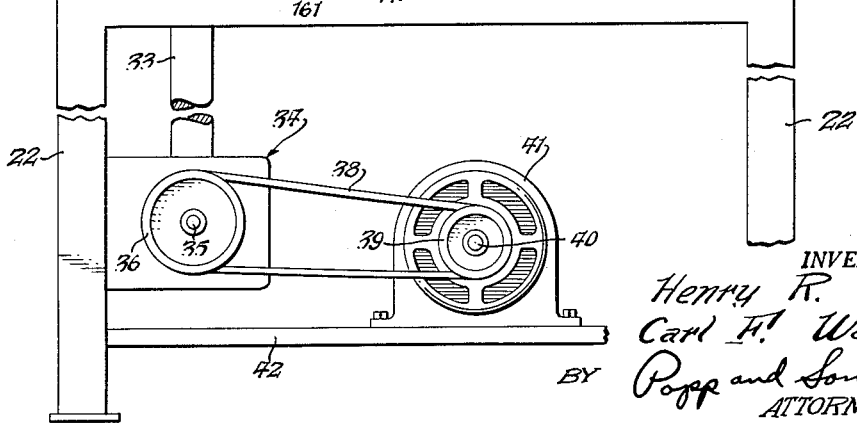

The roller 24 is supported in vertically spaced relation above the machine base plate 23 by an intermediate plate 28 which rests upon the upper surface of the plate 23. As shown in FIG. 5, plates 23 and 28 are provided with alined vertical holes 29 and 30, respectively, which receive a bushing 31 having an out-turned annular flange 32 at its upper end which overlies the upper surface of the intermediate plate 28. Rotatably received in the bushing 31 is a drive shaft 33, the upper end of which is suitably connected to the roller 24 as will be explained later herein. The lower end of the drive shaft 33 is operatively connected to the output shaft of a speed reducer gear box represented generally at 34 in FIG. 2. The input shaft 35 for this gear box 34 has fast thereto a pulley 36. A belt 38 passes around this pulley 36 and also around a drive pulley 39 suitably mounted on output shaft 40 of an electric drive motor 41. The speed reducer gear box 34 is suitably mounted on certain of the frame legs 22. The electric drive motor 41 is shown as being suitably connected to and supported by a horizontal shelf 42 which is carried by the frame legs 22.

The roller 24 is larger in diameter than the rollers 25 and 26 which have about the same diameter. The circular periphery of the forming roller 24 is provided with an annular groove 43 which is horizontally alined with a shallower annular groove 44 provided in the circular periphery of the second roller 25, and is also alined horizontally with a shallow annular groove 45 provided in the circular periphery of the third roller 26. The grooves 43, 44 and 45 in the first, second and third rollers 24, 25 and 26, respectively, cooperate to receive a flat and parallel-edged metal strip, represented at S, and to form this strip into curved shape, as will be later explained.

The rollers 24, 25 and 26 may be variously constructed. As shown, the roller 24 comprises an upper plate 46, a lower plate 48 and an intermediate plate 49. These various plates are disc-shaped and circular in outline with the upper and lower plates 46 and 48, respectively, having the same diameter and the intermediate plate 48 being of smaller diameter. The assembly of plates 46, 49 and 48 is held together and secured to a gear wheel 50 by a plurality of bolts or machine screws 51 arranged at circumferentially spaced intervals, preferably uniform. The bolts 51 pass through alined openings provided in these plates and their inner ends screw severally into internally threaded recesses provided in the gear wheel 50. This gear wheel is formed with gear teeth 52 on its periphery and centrally is formed with an upstanding elongated hub portion 53 on which the plates 46, 48 and 49 are mounted and which embraces a reduced portion 54 of the drive shaft 33. The hub 53 is made fast to the shaft in any suitable manner as by being keyed thereto, a key for this purpose being indicated at 55. The lower surface of the gear wheel 50 rests upon the bushing flange 32.

The roller 25 is shown as comprising an upper plate 56, a lower plate 58 and an intermediate plate 59. These various plates are disc-shaped and circular in outline with the upper and lower plates 56 and 58, respectively, having the same diameter and the intermediate plate 59 being of smaller diameter. The assembly of plates 56, 58 and 59 is secured together by a series of circumferentially spaced bolts or machine screws 60 which pass through alined holes provided in these plates and screw severally into internally threaded recesses provided in a gear wheel 61 having gear teeth 62 formed on its periphery which mesh with the teeth 52 on the gear wheel 50.

The gear wheel 61 has an upstanding elongated tubular hub 63 on which the plates 56, 58 and 59 are mounted and which receives a bushing 64 having an out-turned annular flange 65 at its lower end bearing against the flat lower surface of the gear wheel 61. The other or lower surface of this flange 65 rests upon the base plate 66 of a bracket indicated generally at 68 which also includes an upper horizontal arm 69. The base plate 66 and arm 69 are formed with alined holes which receive a stub shaft or pintle 70. This pintle 70 passes through the bore of the bushing 64. The bracket 68 is suitably rigidly secured to the machine base plate 23. For this purpose the bracket base plate 66 is shown as bolted to the machine base plate 23 as by the bolts 71, best shown in FIG. 4. In this manner, the fixed roller 25 is driven by the fixed main roller 24.

Referring to FIG. 4, it will be seen that the peripheries of the rollers 24 and 25 are in juxtaposition so that the grooves 43 and 44, respectively therein, provide an essentially closed rectangular passage represented by the numeral 72. It is through this passage 72 that the straight metal strip S passes. The upper and lower surfaces of the rectangular passage 72 oppose the respective upper and lower flat sides of the strip S. Likewise, the vertical sides of the passage 72 closely engage the vertical side edges of the strip S.

Referring to FIG. 3, the strip S moves from left to right. Before entering the passage 72 (FIG. 4) this strip passes through a strip guide formed by a member having an elevated horizontal flat surface 73 and upstanding vertical guide surfaces 74 and 75 which engage opposite edges of the strip S. The strip is held in the slot so provided by a cover plate 76. In this manner, the strip is guided to the entrance of the passage 72 jointly formed by the grooves in the main roller 24 and roller 25. The roller 25 is not shown as being adjustable with respect to the main roller 24.

With reference to the movement of the straight strip S, which is from left to right as viewed in FIGS. 1 and 3, the other small roller 26 is arranged forwardly of the comparable small roller 25. It might be considered that the roller 25 in cooperation with the main roller 24 holds the strip S at the last station where it is straight. Thereafter the roller 26 serves to bend or edge roll the strip about the main roller 24. The roller 26 is preferably adjustably movable in an arcuate path about a vertical axis concentric with the main roller 24, in order to vary the radius of curvature of the curved portion S' formed from the straight strip S.

The construction of the roller 26 and the means for adjustably supporting the same will now be described. Referring to FIG. 5, the roller 26 comprises an upper plate 78, a lower plate 79 and an intermediate plate 80. The various plates are disc-shaped and circular in outline with the upper and lower plates 78 and 79, respectively, having the same diameter and the intermediate plate 80 being of smaller diameter. The assembly of plates 78, 79 and 80 is held together and secured to a gear wheel 81 by a plurality of bolts or machine screws 82 arranged at circumferentially spaced intervals, preferably uniform. The bolts 82 pass through alined openings provided in these plates and screw severally into internally threaded recesses provided in the gear wheel 81. This gear wheel is formed with gear teeth 83 on its periphery which mesh with the teeth 52 on the main roller 24. The gear wheel 81 centrally is formed with an upstanding elongated hub portion 84 on which the plates 78–80 are mounted and which receives a bushing 85 having an out-turned annular flange 86 at its lower end bearing against the flat lower surface of the gear wheel 81. The other or lower surface of this flange 86 rests upon the base plate 88 of a bracket indicated generally at 89 which also includes an upper horizontal arm 90. The base plate 88 and arm 90 are formed with alined holes which receive a stub shaft or pintle 91. This pintle 91 passes through the bore of the bushing 85.

The bracket 89 is adjustable, as previously noted, and specifically is pivotal about the axis of the shaft 33. For this purpose, the inner end of the arm 90 which is arranged radially with respect to the vertical shaft 33 is formed with a vertical hole 92 in which a bushing 93 is arranged. The bore of this bushing 93 receives the reduced upper end portion 94 of the shaft 33. In order to assist in maintaining the constancy of the spacing between the axes of the shafts 91 and 94, the bracket 89 is additionally supported against radially outward movement away from the main roller 24. For this purpose, the base plate 88 of the bracket 89 has an outer convex end face 95 which is formed with a curvature generated about the vertical axis of the drive shaft 33. This curved face 95 is opposed and engaged by an inwardly facing concave surface 96 of the same curvature and formed on a back-up plate 98 which is suitably rigidly secured to the machine base plate 23, as by bolts or machine screws 99.

The base plate 88 of the bracket 89 is constantly urged downwardly against the upper surface of the machine base plate 23 so as to maintain the opposed relationship of the curved surfaces 95 and 96 at all times. While the hold-down means may be constructed in any suitable manner, as shown, they comprise a hold-down bar 100 which extends across and engages the upper surface of the base plate 88 of the bracket 89. The bar 100 is urged downwardly against the bracket base plate 88 by a pair of springs 101 severally mounted on bolts 102 screwed into threaded recesses provided in the machine base plate 23. The bolts 102 are arranged on opposite sides of the bracket base plate 88 and extend through enlarged holes provided in the hold-down bar 100. In order to prevent the hold-down bar 100 from rocking, each end of this bar carries a depending block 103 the lower end of which is closely spaced to the upper surface of the machine base plate 23.

The means for adjusting the angular position of the bracket 89 are shown as comprising a horizontally arranged bell crank lever 104 pivoted adjacent one end about the axis of a vertical pin 105. This pin 105 is shown as carried by the back-up plate 98. Referring to FIG. 5, the base plate 88 of the bracket 89 carries a crosshead or slide block 106 which is held to this plate by a vertical bolt or machine screw 108 but is pivotal about its vertical axis. The adjusting lever 104 is formed with a cutout or opening 107 having opposed vertical surfaces which receive the corresponding vertical surfaces of the pivotal block or crosshead 106. Thus, when the adjusting lever 104 is moved about the vertical axis of its pivot 105, the crosshead 106 rides in the ways provided by the opening 107 in this lever 104 and thereby effects movement of the outer end of the bracket 89 about the vertical axis of its pivot 94.

In order to adjust the angular position of the lever 104, the outer or free end thereof is shown as rotatably carrying a horizontally arranged adjusting screw 109 having a cross bar handle 110 at one end. The other end portion of this adjusting screw 109 is externally threaded and is received in an internally threaded horizontal hole provided in an anchor block 111 suitably fixed to the machine base plate 23.

Referring to FIGS. 1 and 3, it will be seen that if the lever 104 is adjusted in a clockwise direction about the vertical axis of its pivot 105, the bracket 89 carrying the roller 26 will be moved in a counter-clockwise direction about the vertical axis of its pivot 94. Such an adjustment tends to increase the radius of curvature of the edge-rolled curved portion S'. On the other hand, if the lever 104 is moved in a counter-clockwise direction about the vertical axis of its pivot 105, the outer end of the bracket 89 will move in a clockwise direction about the vertical axis of its pivot 94 so as to move across a projection of the straight strip S being fed into the machine and thereby reduce the radius of curvature of the curved portion S' being formed from this strip.

It will be noted that the various grooves 43, 44 and 45 in the three rollers 24, 25 and 26 are arranged in the same horizontal plane and cooperate to embrace the metal strip where these rollers are contiguous. As can be seen from FIG. 5, the annular groove 43 in the roller 24 is radially deeper than it is axially wide for receiving the major portion of the metal strip, whereas the annular grooves 44 and 45 in the other two rollers 25 and 26, respectively, receive the other marginal and minor portion of the strip. The radially deeper groove 43 has the advantage of preventing buckling of the metal strip as it is rolled about the axis 113. Also, in this deeper groove 43 the marginal portion of the metal strip along its inner edge is compressed while the marginal portion along the outer edge which is received in the shallower grooves 44, and 45 is tensioned. The rollers 25 and 26 being driven by the main roller 24 through their respective gear wheels 50, 61 and 81 associated therewith provide a rolling contact with the vertical edges of the metal strip and the pinching type of engagement between these rollers and the strip has been found effective as the sole and constant drive for feeding the strip into the machine. Accordingly, the metal strip including its straight portion S and its curved portion S' is constantly moving. The straight portion S of the strip may be unwound from a reel (not shown).

An important feature of the present invention is to provide means for cutting off segments of the curved portion S' and having a predetermined length so that segmental articles can be produced simply and quickly. While such strip severing means may be constructed in any suitable manner, as shown, such means comprise shear means carried by a movable carriage represented generally by the numeral 112. Referring to FIG. 3, it will be noted that the curved portion S' is formed generally about a vertical axis 113 which is eccentric with respect to the vertical axis of the drive shaft 33 on which the main roller 24 is mounted. The carriage 112 is arranged for pivotal movement about this axis 113. In order to provide a support for the pivot of the carriage, a bridge member is supported on the machine base plate 23 and extends over the roller 24 and the brackets 68 and 89 for the respective small rollers 25 and 26. Such bridge member is shown as including a horizontal plate 114 supported at one end on a rectangular post 115 and its other end on a round post 116. The posts 115 and 116 are upstanding from and suitably connected to the machine base plate 23. The carriage 112 is shown as including a horizontal arm 118 which extends radially with respect to the vertical axis 113 for pivotal movement of the carriage. The inner end of the carriage arm 118 is suitably pivotally connected to a vertical pivot pin indicated at 119 in FIG. 2 and suitably mounted on the horizontal bridge element 114.

Arranged below the outer end of the carriage arm 118 is a carriage base plate 120 which supports a pair of spaced blocks 121 and 122. These blocks are secured to the base plate 120 in any suitable manner as by the screws 123. An intermediate block 124 is arranged between the blocks 121 and 122. This intermediate block 124 is suitably cut out to receive a stationary shear blade 125. The upper edge 126 of the stationary blade 125 is arranged horizontally in general alinement with the bottom wall of a guide slot 128 formed in the end block 122.

Arranged to cooperate with the stationary blade 125 for cutting the strip S' is a movable shear blade 129. This blade 129 is arranged above the strip S' where as the fixed blade 125 is arranged therebelow. The movable blade 129 is suitably mounted as by the bolts or machine screws 130 on a pivoted blade carrier 131. The blade carrier 131 has a depending portion 132 formed adjacent its free end with a horizontal hole 133. This hole 133 receives a pivot pin 134 which is suitably secured at its ends in the blocks 121 and 122.

The lower portion of the carriage including the base plate 120 and blocks 121, 122 and 124 and the fixed blade 125 are hung from the carriage arm 118. For this purpose two pairs of hangers are provided. One pair includes two bolts 135 which extend downwardly through holes provided in the carriage arm 118 and have their lower ends (not shown) screwed severally into internally threaded recesses provided in the end block 121. A spacer in the form of a tube 136 surrounds the intermediate shank portion of each bolt 135 and has its ends bearing against the corresponding opposing faces of the carriage arm 118 and end block 121. Referring to FIG. 7, it will be observed that the bolts 135 and spacers 136 are arranged on one side of the movable blade carrier 131. On the opposite side thereof, a similar pair of bolts 138 and spacers 139 are operatively arranged between the carriage arm 118 and the other end block 122. Each of the end blocks 121 and 122 is shown as carrying on its outer end a roller 140 which is rotatable about a horizontal axis. The periphery of the rollers 140 engage the upper flat horizontal surface of a platform 141 which is suitably mounted on the upper surface of the machine base plate 23. Thus, the rollers 140 roll on the surface of the platform 141 to support the carriage 112 in its movement.

An adjustable stop screw 142 is shown as carried by the carriage arm 118. This screw is vertically arranged so that the top surface of the blade carrier 131 is adapted to engage the lower end of this screw and thereby limit upward movement of the blade carrier in a clockwise direction about the axis of the pivot pin 134 as viewed in FIG. 6.

Means are provided for actuating the shear means which involves moving the movable blade carrier 131 relative to the fixed blade 125. While such means may be variously constructed, as shown, such means comprises a generally horizontal actuating arm 143 arranged in an elevated position above the top of the blade carrier 131. This arm 143 is supported in this elevated position by a pair of struts 144 suitably connected rigidly at opposite ends to the members 131 and 143. A helical compression spring 145 is shown as operatively interposed between the carriage arm 118 and the actuating arm 143 whereby this arm is always urged upwardly by the spring. This operates to urge the movable shear blade 129 to an upper or open position with respect to the fixed shear blade 125.

The means employed to move the actuating arm 143 which in turn closes the shear means, preferably comprise a fluid operated actuator represented generally at 146. The actuator 146 may be of any suitable type and comprises a cylinder 148 in which a piston (not shown) is reciprocally arranged and mounted on a piston rod or force member 149 which extends vertically downwardly through the bottom end wall of the cylinder 148. The vertical axis of the actuator 146 is concentric with the carriage axis 113. The outer or lower end of the piston rod 149 is adapted to engage the inner end of the radially arranged actuating arm 143. The actuator 146 is shown as supported by a horizontal support plate 150 which is mounted in an elevated position above the actuating arm 143 by any suitable means shown as including a center post 251 and a pair of auxiliary posts 252 arranged at spaced intervals. The lower ends of the posts 251 and 252 are suitably supported on the horizontal element 114 of the bridge member previously referred to.

While any suitable working fluid medium may be employed to operate the actuator 146, it is preferred to employ compressed air. The flow of operating fluid with respect to the actuator 146 is controlled by an electrically operated solenoid flow valve assembly 248 which may be of any suitable conventional type. Referring to FIG. 1, the valve assembly 248 is shown as having actuating lines or conduits 249 and 250 leading from this valve assembly to the actuator. Compressed air from a source (not shown) is supplied to the solenoid valve assembly 248 via a line or conduit 251. It will be seen that by admitting pressurized fluid into the actuator 146 at the appropriate time, the shear means will be closed to sever the metal strip.

Means are provided for controlling the operation of the solenoid valve assembly 248 whereby segments of predetermined length may be formed from the curved portion S' of the metal strip. While such means may be variously constructed, the same are shown as comprising an electrical switch device represented generally at 152 having a pivoted trip arm or lever 153. This switch lever 153 is biased suitably toward the position shown in FIG. 3. The switch device 152 is operatively associated via the electrical line 154 with the solenoid valve assembly 248 and is shown as mounted in a pendant position on the outer end of a support arm 155 which extends radially outwardly from the vertical pivot axis 113 of the carriage 112. The switch support arm 155 is preferably arranged for adjustment in a horizontal plane so that the angle between this arm 155 and the shear suport arm 118 can be varied as desired to control the effective circumferential extent or length of the segments cut from the curved portion S' of the metal strip, as will be explained more fully later herein. The lower portion of the switch device 152 carries a horizontal slotted guide 158. This guide preferably has an outwardly diverging entrance which receives the leading end of the strip and guides the same into engagement with the trip lever 153 of the switch 152.

The curved portion S' of the metal strip is supported in the span between the shear means and the switch means by a shelf 159 which is of arcuate form and arranged generally horizontally below the strip S'. One end of this shelf 159 is shown as having a down-turned flange 160 secured in any suitable manner as by one or more bolts or machine screws 161 to end block 121, as best shown in FIG. 9. The other end of the shelf 159 is shown as resting on the lower member of the guide 158.

Intermediate its ends, the arcuate shelf 159 is shown as supporting in an elevated position a retainer plate 162. The curved portions S' of the strip passes under the retainer plate 162. Arranged partially within the vertical space between the shelf 159 and retainer plate 162 is an ejector leaf spring 163. One end of this spring 163 is suitably connected to the shelf 159 and for this purpose a block 164 is shown as arranged on the upper surface of the shelf 165 and is suitably secured to this shelf. The fixed end of this leaf spring 163 engages one side of this block 164 and is clamped thereto by a plate 165.

The ejector leaf spring 163 is normally bent by the curved portions S' of the strip so as to lie along the inner edges of this strip, i.e., the edge having the shorter radius. When the shear means have been actuated so as to sever a curved portion of the strip, the ejector spring 163 then operates to push the segment off the shelf to make room for another segment to be formed. The ejected segments may be collected in any suitable manner as by falling into a hopper (not shown).

Inasmuch as the shear means operate upon a continuously moving strip such means must move correspondingly and that is the purpose of the pivotal mounting of carriage 112. The starting position of the movable carriage 112 is shown in FIG. 3. In such position, the block 122 rests upon a rubber faced bumper 166. Means are provided for constantly urging the carriage 112 against the bumper 166. While such means may be variously constructed, the same is shown as comprising a piston and cylinder device represented generally at 168. This device includes a cylinder 169 pivotally connected adjacent one end to the adjacent frame, as indicated at 170. Slidably arranged within the cylinder 168 is a piston 171 connected to a piston rod 172. The outer end of this piston rod 172 is suitably pivotally connected to the carriage 112. As shown, the rod has a clevis connector 173 secured at one end to the outer end of the piston rod and at its other end to the carriage arm 118 as by being fastened by one of the bolts 138. The end portion of the cylinder 169 on the side of the piston 171 adjacent the pivot 170 is vented continuously to asmosphere through a vent opening 174.

The chamber on the opposite side of the piston is shown as being supplied with compressed air via a line or conduit 175. Preferably the pressure of the compressed air in the line 175 is considerably below that in the supply line 151. For this purpose, a pressure regulator 176 which may be of any suitable type is shown as being operatively arranged in the line 175.

When the carriage 112 moves with the strip S' about the vertical pivotal axis 113, the piston 171 is moved toward the end of the cylinder 169 at which end compressed air at reduced pressure is introduced via the line 175. Such movement of the carriage 112 is against the urging of the piston 171 which is acted upon by the pressurized fluid. When the shears means release the strip, the pressurized fluid bearing against the end face of the piston 171 is effective in moving this piston toward the vented end of the cylinder and thereby return the carriage 112 to its starting position against the bumper 166.

It is also pointed out that so long as the trip lever 153 of the electrical switch device 152 remains actuated or tripped, the actuator piston rod or force member 149 is urged downwardly by the operating fluid introduced into the cylinder 148. However, when the switch lever 153 is untripped or deactuated, the piston rod or force member 149 is retracted upwardly so as to permit the spring 145 to raise the movable shear knife 129 and its carrier 131. Such upward movement is effected as pivotal movement in a clockwise direction about the axis of the pivot pin 134 as viewed in FIG. 6.

Operation

The operation of the edge rolling machine is believed best explained by following the sequence of events diagrammatically illustrated successively in FIGS. 8 through 13. In each of these figures, the straight portion of the metal strip is represented by the letter S and the curved portion formed therefrom by the letter S'. A free segment cut from the curved portion is represented at S''.

In FIG. 8, the switch lever 153 is shown about to be tripped by the leading edge of the curved strip portion S'. In this position, the shear means, including the fixed lower blade 125 and movable upper blade 129, are open. The curved portion S' is formed by passing through the cooperating grooves formed in the three rollers 24, 25 and 26. The shear blades 125 and 129 are diagrammatically shown as carried on the arm 118'. The trip lever 153 is diagrammatically shown as carried on the arm 155'. The arms 118' and 155' are in a fixed angular position with respect to each other and will move as a unitary structure, along with the shear blades 125 and 129, the trip lever 153 and the ejector spring 163, these elements diagrammatically constituting the carriage 112 shown in the figures preceding FIG. 8.

FIG. 9 represents the electrical switch just closed by tripping of the switch lever 153. This is effected by the advancing curved portion S' engaging and pushing the free end of the switch lever 153. In addition, FIG. 9 represents the shear blades at the threshhold of their relative movement toward each other or at the beginning of being closed so that they have not as yet engaged the curved strip portion S'. When the switch 152 closes, the solenoid valve assembly 248 is energized. The solenoid valve assembly 248 permits compressed air to flow into the actuator 146 which operates to drive its force member 149 downwardly. This downward movement is transmitted to the shear actuator arm 143 which forces the carrier 131 with its blade 129 to pivot downwardly about the axis of pivot pin 134 against the urging of return spring 145, thereby closing the shears upon the metal strip.

FIG. 10 represents the switch lever 153 still tripped so that the switch 152 is still actuated but the shear blades 125 and 129 have been fully closed. Once the shear starts to close, a mechanical connection is established between the carriage 112 and the continuously moving strip so that this carriage is caused to move. Accordingly, it will be noted that the carriage represented diagrammatically by the lines 118' and 155' in FIG. 10 is displaced angularly from the corresponding lines in FIG. 9. This movement of the carriage 112 away from its bumper 166 is against the urging of the pneumatically operated piston and cylinder device 168.

FIG. 11 represents the severed segment S" ejected by the spring 163 sufficient to disengage the leading end of the segment S" from the trip lever 153 which is restored to its untripped position because of its bias theretoward. FIG. 11 also represents the shears 125 and 129 at the threshold of separation or opening whereby the lowered upper movable shear blade 129 still serves as a physical barrier for the constantly advancing curved portion S' being formed. This engagement between the portion S' and the shear serves to continue the pivotal movement of the carriage 112 of the vertical axis 113.

Untripping the switch lever 153 operates to deenergize the solenoid valve assembly 248 which effects a retraction of the force member 149 of the actuator 146. This then permits return spring 145 to pivot upwardly the upper shear blade 129, carrier 131 and arm 143, thereby opening the shears.

FIG. 12 represents the switch lever 153 fully restored and with the shear blades 125 and 129 just fully opened so that the carriage is at its extreme displaced position and about to be freed from mechanical connection with the constantly moving strip portion S'.

Finally, FIG. 13 represents the switch lever 153 in its restored position with the curved strip portion S' having passed through the now open shear blades 125 and 129. The strip is continuing to advance and the carriage 112 is returning toward its bumper 166 under the influence of the pneumatically operated piston and cylinder device 168. Comparing FIG. 13 with FIG. 12, it will be noted that FIG. 13 has moved counter-clockwise about the pivotal axis 113, this being effected by the piston and cylinder device 168.

From the foregoing, it will be seen that the present invention provides a metal rolling machine including means for edge rolling a continuously moving metal strip into curved shape and means for successively cutting off segments of the curved portion of the strip while the same is moving and each of the segments has a predetermined length. If it is desired to change the effective length of the segment S", the angle A (FIGS. 3, 11) between the support arms 118 (118') and 155 (155') is varied. If this angle is reduced, the effective length of the segment S" is shortened; and if the angle is increased, the effective length is increased. The machine operates rapidly and has produced segments at the rate of about two thousand pieces per hour.

Since changes and modifications in the preferred embodiment of the present invention illustrated will be apparent to those skilled in the art, the embodiment specifically shown and described is illustrative and not limitative of the invention, the scope of which is to be measured by the appended claims.

What is claimed is:

1. In a metal rolling machine, the combination comprising means for edge rolling a continuously moving metal strip into curved shape, and means for cutting off a segment of the curved portion of said strip while it is moving, said cutting off means including a carriage, relatively movable shear blades carried by said carriage and arranged on opposite sides of said strip, fluid operated actuating means arranged to move said shear blades relatively toward each other, electrically operated valve means for controlling fluid flow with respect to said actuating means and switch means operatively associated with said valve means and adapted to be tripped by said strip thereby to control relative movement of said shear blades toward each other.

2. In a metal rolling machine, the combination comprising means for edge rolling a continuously moving metal strip into curved shape, and means for cutting off a segment of the curved portion of said strip while it is moving, said cutting off means including a carriage, closable normally-open shear means carried by said carriage, means arranged to urge said shear means to an open condition, actuating means arranged to close said shear means, means adapted to be engaged by said strip to control operation of said actuating means, closing of said shear means upon said moving strip operating to move said carriage away from a starting position of rest and means arranged to return said carriage to said starting position upon said shear means releasing said strip following opening of said shear means.

3. In a metal rolling machine, the combination comprising means for edge rolling a continuously moving metal strip into curved shape, and means for cutting off a segment of the curved portion of said strip while it is moving, said cutting off means including a carriage, closable normally-open shear means carried by said carriage, means arranged to urge said shear means to an open condition, actuating means arranged to close said shear means, means adapted to be engaged by said strip to control operation of said actuating means, closing of said shear means upon said moving strip operating to move said carriage away from a starting position of rest, means for ejecting a segment following severance by said shear means from contact with said strip engageable means thereby to release such means and allow said shear means to open and means arranged to return said carriage to said starting position upon said shear means releasing said strip following opening of said shear means.

4. In a metal rolling machine, the combination comprising means for edge rolling a continuously moving metal strip into curved shape, and means for cutting off a segment of the curved portion of said strip while it is moving, said cutting off means including a carriage movably arranged to pivot about a fixed axis, shear means carried by said carriage and including an actuating arm, fluid operated actuating means including a movable force member arranged for travel substantially along said axis to engage said arm and control means adapted to be engaged by said strip for controlling operation of said actuating means.

5. In a metal rolling machine, the combination comprising means for edge rolling a continuously moving metal strip into curved shape and including a first roller having in its periphery an annular groove radially deeper than it is axially wide for receiving one marginal and major portion of said strip and second and third rollers spaced from said first roller and from each other and severally having in their peripheries an annular groove for receiving the other marginal and minor portion of said strip, said rollers cooperating to edge roll said strip about said first roller, and means for cutting off a segment of the curved portion of said strip while it is moving.

6. In a metal rolling machine, the combination comprising means for edge rolling a continuously moving metal strip into curved shape and including a first roller having in its periphery an annular groove for receiving one marginal portion of said strip, second and third rollers spaced from said first roller and from each other and severally having in their peripheries an annular groove for receiving the other marginal portion of said strip, drive means for rotating said rollers, said rollers cooperating to edge roll said strip about said first roller and constituting the sole drive for moving said strip, and means for cutting off a segment of the curved portion of said strip while it is moving.

7. In a metal rolling machine, the combination comprising means for edge rolling a continuously moving metal strip into curved shape and including a first roller having in its periphery an annular groove for receiving one marginal portion of said strip, a second roller spaced radially away from said first roller and having in its periphery an annular groove for receiving the other marginal portion of said strip, a third roller arranged in front of said second roller and spaced radially therefrom and also from said first roller and having in its periphery an annular groove for receiving said other marginal portion of said strip and means arranged for adjustably positioning said third roller in a path concentric with said first roller thereby to vary selectively the radius of curvature of the curved portion of said strip, and means for cutting off a segment of the curved portion of said strip while it is moving.

References Cited in the file of this patent

UNITED STATES PATENTS

| | | | |
|---|---|---|---|
| 1,144,459 | Burman | June 29, | 1915 |
| 1,269,631 | Mosby | June 18, | 1918 |
| 1,602,399 | Ekman | Oct. 12, | 1926 |
| 2,202,555 | Johnston | May 28, | 1940 |
| 2,206,068 | Yoder | July 2, | 1940 |
| 2,398,172 | Bruegger | Apr. 9, | 1946 |
| 2,540,166 | Frank et al. | Feb. 2, | 1951 |
| 2,562,475 | Penkala | July 31, | 1951 |
| 2,923,343 | Franks | Feb. 2, | 1960 |